(12) United States Patent
Kawashima (10) Patent No.: US 6,452,605 B1
(45) Date of Patent: Sep. 17, 2002

(54) METHOD, APPARATUS, AND RECORDING MEDIUM FOR MODIFYING A VIEW IN CAD

(75) Inventor: Yoshihiro Kawashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/225,326

(22) Filed: Jan. 5, 1999

(30) Foreign Application Priority Data

Jul. 27, 1998 (JP) .......................................... 10-211157

(51) Int. Cl.⁷ .............................. G09G 5/00; G09F 3/14
(52) U.S. Cl. ..................................................... 345/661
(58) Field of Search ................................ 345/661, 664, 345/665, 676, 679, 680, 790, 792, 798, 800

(56) References Cited

U.S. PATENT DOCUMENTS 5,487,143 A * 1/1996 Southgate
5,699,535 A * 12/1997 Amro
5,760,772 A * 6/1998 Austin
5,956,032 A * 9/1999 Argiolas
6,141,008 A * 10/2000 Bloomfield
6,166,736 A * 12/2000 Hugh

FOREIGN PATENT DOCUMENTS

JP 2-77832 3/1990
JP 9-101863 4/1997

* cited by examiner

Primary Examiner—Jeffery Brier
(74) Attorney, Agent, or Firm—Staas & Hasley LLP (57) ABSTRACT

A computer-aided design apparatus improves operability in CAD and includes a view function which automatically enlarges a view frame or automatically modifies the display scale factor if a drawing element that exceeds the view frame is input. The computer-aided design apparatus performs design work by setting a plurality of views of different origins and coordinate systems on a screen.

11 Claims, 12 Drawing Sheets

| PRIMITIVE ID | PRIMITIVE CLASSIFICATION ID | ASSIGNED VIEW ID | DRAWING DATA |
|---|---|---|---|
| 1 | 101(STRAIGHT LINE) | 1 | 0.0,0.0,15.0,15.0 |
| 2 | 102(CIRCLE) | 2 | 0.0,0.0,23.0 |
| 3 | 105(SPLINE CURVE) | 1 | 0.0,0.0,15.0,10.0,············ |
| 4 | 101(STRAIGHT LINE) | 3 | 100.0,100.0,100.0,155.0 |
| ········ | ········ | ········ | ········ |

FIG.3

| VIEW ID | VIEW NAME | COORDINATE SYSTEM | ORIGIN OFFSET | VIEW FRAME RECTANGULAR COORDINATES | RELATED VIEWS |
|---|---|---|---|---|---|
| 0 | GLOBAL | | 0.0,0.0 | 0,0,0,0 | |
| 1 | x_y | x_y | 0.0,0.0 | -10,100,90,-10 | *V_Rel_P[1] |
| 2 | x_z | x_z | 0.0,120.0 | -10,220,90,110 | *V_Rel_P[2] |
| 3 | -z_y | -z_y | 110.0,0.0 | 100,100,200,-10 | *V_Rel_P[3] |
| ........ | ........ | ........ | ........ | ........ | ........ |

FIG.4

| | | |
|---|---|---|
| *V_Rel_P[1] | 2 | ·····RELATED VIEW NUMBER |
| | y | ·····RELATED DIRECTION |
| | 2 | ·····RELATED VIEW ID |
| | x | ·····RELATED DIRECTION |
| | 3 | ·····RELATED VIEW ID |
| *V_Rel_P[2] | 1 | |
| | y | |
| | 1 | |
| *V_Rel_P[3] | 1 | |
| | x | |
| | 1 | |
| | ⋮ | |

METHOD, APPARATUS, AND RECORDING MEDIUM FOR MODIFYING A VIEW IN CAD

BACKGROUND OF THE INVENTION

1. Field of the Invention

The present invention relates to computer aided design technology for performing design work by setting a plurality of views of different origins and coordinate systems on a screen, and in particular to techniques for improving operability.

2. Description of the Related Art

Heretofore, there is known a computer aided design (referred to hereunder as CAD) apparatus wherein drafting, simulation etc. in design work is performed in interactive form with a computer. As one example of a CAD apparatus, there is a device incorporating a view function which sets a plurality of views of different origins and coordinate systems on a screen, and performs design work in the respective views corresponding to elevation view, plan view and side view. With CAD provided with a view function, in order to define the input regions in the respective views, the setting of the view frames for the input regions is generally performed for each respective view.

However, with CAD provided with a view function, in the case of inputting a drawing element which exceeds the view frame, the view frame must be enlarged or the display scale factor for the drawing element changed before inputting the drawing element.

Generally, the input of the drawing element to one view frame accompanies the input operation for the drawing element to the other view frame. That is to say, when the drawing element is input to the elevation view, the drawing element must also be reflected in the plan view and the side view etc. Consequently, in the case where a plurality of view frames are set, the input of a drawing element which exceeds the view frame requires enlargement of all of the view frames. Hence operability is poor.

SUMMARY OF THE INVENTION

Accordingly, the present invention takes into consideration the above heretofore problems, with the object of providing techniques for improving operability in CAD provided with a view function, in the case of inputting a drawing element which exceeds the view frame, by performing automatic enlargement of the view frame or automatic modification of the display scale factor.

Furthermore, another object of the present invention is to distribute recording media on which the computer aided design program of the present invention is recorded, so that people who acquire the recording media can easily construct a computer aided design apparatus.

To achieve the aforementioned objects, a first means for solving the problems is characterized in that a computer aided design apparatus comprises; a view creating device for creating a view in which an origin and a coordinate system are set on a screen, a view frame creating device for creating a view frame which becomes an input region for the view created by the view creating device, a first judgment device for judging, when a drawing element is being input to the view frame created by the view frame creating device, if part of the drawing element has been input to outside of the view frame, and a view frame enlarging device for enlarging, when judged by the first judgment device that part of the drawing element has been input to outside of the view frame, the view frame so as to contain the drawing element.

With such a construction, in the case of performing design work, at first a view in which is set an origin and a coordinate system is created by the view creating device. Then as required, a view frame serving as an input region for the view, is created by the view frame creating device. After this, the operation of inputting the drawing element to the created view frame is performed. With the operation of inputting the drawing element, when part of the drawing element is input to outside of the view frame, this condition is detected by the first judgment device. As a result, the view frame is automatically enlarged by the view frame enlarging device so as to contain the input drawing element. On the other hand, if the drawing element is not input to outside of the view frame, input of the drawing element to outside of the view frame is not detected, and hence the view frame is not automatically enlarged. That is to say, when part of the drawing element is input to outside of the view frame, the view frame is automatically enlarged to contain the input drawing element, and hence the operation of enlarging the view frame prior to input of the drawing element is not required. Consequently in the case of inputting a drawing element which exceeds the view frame, the operation of enlarging the view frame prior to input of the drawing element is not required, and hence operability can be improved.

Furthermore, the construction may be such that in the case where there is another view frame other than the view frame into which the drawing element has been input, the view frame enlarging device also enlarges the other view frame.

With such a construction, in the case where there is another view frame other than the view frame into which the drawing element has been input, the other view frame is also enlarged in conjunction with the enlargement of the view frame into which the drawing element has been input. For example, with a screen for displaying three views, when a drawing element is input to a view frame for displaying the elevation view, the input drawing element must also be input to view frames for displaying the plan view and the side view. Consequently, if the other view frames are also automatically enlarged, then when a drawing element is input to the other view frames, it is not necessary to again modify the size of the view frame. Hence operating efficiency can be increased.

Moreover, the construction may be such that the view frame enlarging device comprises; a second judgment device for judging, in the case where the view frame into which the drawing element has been input is enlarged, if the view frame would overlap the other view frame, and an enlargement prohibit device for prohibiting enlargement of the view frame into which the drawing element has been input and the other view frame, when judged by the second judgment device that there would be overlap.

With such a construction, the second judgment device judges, when the view frame into which the drawing element has been input is enlarged, if this would overlap the other view frame. Then, if judged that this would overlap the other view frame, enlargement of the view frame is prohibited by the enlargement prohibit device. Consequently, mutual overlapping of the view frames can be prevented, thus avoiding difficulties in the design operation.

In addition, the construction may be such that the view frame enlarging device comprises; a rectangular region computing device for computing a rectangular region circumscribing the drawing element and all of the already input drawing elements, and an enlarging device for enlarging the view frame into which the drawing element has been input so as to coincide with the rectangular region computed by the rectangular region computing device.

With such a construction, in enlarging the view frame so as to contain the input drawing element, at first a rectangular region circumscribing the drawing element and all of the already input drawing elements is computed by the rectangular region computing device. After this, the view frame is enlarged by the enlarging device so as to coincide with the computed rectangular region. Consequently, enlargement control of the view frame is performed by an extremely simple process, and hence any drop in performance of the computer aided design apparatus can be prevented.

A second means for solving the problems is characterized in that a computer aided design apparatus comprises; a view creating device for creating a view in which an origin and a coordinate system are set on a screen, a view frame creating device for creating a view frame which becomes an input region for the view created by the view creating device, a judgment device for judging, when a drawing element is being input to the view frame created by the view frame creating device, if part of the drawing element has been input to outside of the view frame, and a display scale factor modifying device for modifying, when judged by the judgment device that part of the drawing element has been input to outside of the view frame, a display scale factor for the drawing element and all of the already input drawing elements so that they are all displayed within the view frame.

With such a construction, in the case of performing design work, at first a view in which is set an origin and a coordinate system is created by the view creating device. Then as required, a view frame serving as an input region for the view, is created by the view frame creating device. After this, the operation of inputting the drawing element to the created view frame is performed. With the operation of inputting the drawing element, when part of the drawing element is input to outside of the view frame, this condition is detected by the judgment device. As a result, the display scale factor for the drawing element and all of the already input drawing elements is automatically modified by the display scale factor modifying device so that they are all displayed within the view frame. On the other hand, if the drawing element is not input to outside of the view frame, input of the drawing element to outside of the view frame is not detected, and hence the display scale factor for the drawing element is not automatically modified. That is to say, when part of the drawing element is input to outside of the view frame, the display scale factor is automatically modified so that all of the drawing elements are displayed within the view frame, and hence the operation of modifying the display scale factor prior to input of the drawing element is not required. Consequently in the case of inputting a drawing element which exceeds the view frame, the operation of modifying the display scale factor prior to input of the drawing element is not required, and hence operability can be improved.

Furthermore, the construction may be such that in the case where there is another view frame other than the view frame into which the drawing element has been input, the display scale factor modifying device also modifies the display scale factor for the other view frame.

With such a construction, in the case where there is another view frame other than the view frame into which the drawing element has been input, the display scale factor for the other view frame is also modified in conjunction with the modification of the display scale factor for the view frame into which the drawing element has been input. For example, with a screen for displaying three views, when a drawing element is input to a view frame for displaying the elevation view, the input drawing element must also be input to view frames for displaying the plan view and the side view. Consequently, if the display scale factors for the other view frames are also automatically modified, the display scale factors for all of the view frames are unified, and hence the drawing element can be input while referring to the drawing displayed on the other view frames, thus enabling a reduction in design error.

The construction may be such that the display scale factor modifying device comprises; a rectangular region computing device for computing a rectangular region circumscribing the drawing element and all of the already input drawing elements, a reduction scale factor computing device for computing a reduction scale factor for displaying the drawing element and all of the already input drawing elements within the rectangular region computed by the rectangular region computing device, and a modifying device for modifying the display scale factor for the drawing element and all of the already input drawing elements, based on the reduction scale factor computed by the reduction scale factor computing device.

With such a construction, in displaying all of the drawing elements in the view frame, at first a rectangular region circumscribing the drawing element and all of the already input drawing elements is computed by the rectangular region computing device. Then, a reduction scale factor for displaying all of the drawing elements within the computed rectangular region is computed by the reduction scale factor computing device. After this, the display scale factor for the drawing element and all of the already input drawing elements is modified by the modifying device, based on the computed reduction scale factor. Consequently, modification control of the display scale factor is performed by an extremely simple process, and hence any drop in performance of the computer aided design apparatus can be prevented.

A third means for solving the problems is characterized in that a computer aided design method comprises; a view creating step for creating a view in which an origin and a coordinate system are set on a screen, a view frame creating step for creating a view frame which becomes an input region for the view created by the view creating step, a judgment step for judging, when a drawing element is being input to the view frame created by the view frame creating step, if part of the drawing element has been input to outside of the view frame, and a view frame enlarging step for enlarging, when judged by the judgment step that part of the drawing element has been input to outside of the view frame, the view frame so as to contain the drawing element.

With such a construction, in the case of performing design work, at first a view in which is set an origin and a coordinate system is created by the view creating step. Then as required, a view frame serving as an input region for the view, is created by the view frame creating step. After this, the operation of inputting the drawing element to the created view frame is performed. With the operation of inputting the drawing element, when part of the drawing element is input to outside of the view frame, this condition is detected by the judgment step. As a result, the view frame is automatically enlarged by the view frame enlarging step so as to contain the input drawing element. On the other hand, if the drawing element is not input to outside of the view frame, input of the drawing element to outside of the view frame is not detected, and hence the view frame is not automatically enlarged. That is to say, when part of the drawing element is input to outside of the view frame, the view frame is automatically enlarged to contain the input drawing element, and hence the operation of enlarging the view frame prior to input of the drawing element is not required. Consequently in the case of inputting a drawing element which exceeds the view frame, the operation of enlarging the view frame prior to input of the drawing element is not required, and hence operability can be improved.

A fourth means for solving the problems is characterized in that a computer aided design method comprises; a view creating step for creating a view in which an origin and a coordinate system are set on a screen, a view frame creating step for creating a view frame which becomes an input region for the view created by the view creating step, a judgment device for judging, when a drawing element is being input to the view frame created by the view frame creating step, if part of the drawing element has been input to outside of the view frame, and a display scale factor modifying step for modifying, when judged by the judgment step that part of the drawing element and all of the already input drawing elements has been input to outside of the view frame, a display scale factor for the drawing element so that the drawing element and all of the already input drawing elements are displayed within the view frame.

With such a construction in the case of performing design work, at first a view in which is set an origin and a coordinate system is created by the view creating step. Then as required, a view frame serving as an input region for the view, is created by the view frame creating step. After this, the operation of inputting the drawing element to the created view frame is performed. With the operation of inputting the drawing element, when part of the drawing element is input to outside of the view frame, this condition is detected by the judgment step.

As a result, the display scale factor for the drawing element and all of the already input drawing elements is automatically modified by the display scale factor modifying step so that the drawing element and all of the already input drawing elements are displayed within the view frame. On the other hand, if the drawing element is not input to outside of the view frame, input of the drawing element to outside of the view frame is not detected, and hence the display scale factor for the drawing element is not automatically modified. That is to say, when part of the drawing element is input to outside of the view frame, the display scale factor is automatically modified so that all of the drawing elements are displayed within the view frame, and hence the operation of modifying the display scale factor prior to input of the drawing element which exceeds the view frame, the operation of modifying the display scale factor prior to input of the drawing element is not required and hence operability can be improved.

As a fifth means for solving the problems there is provided a recording medium on which is recorded a computer aided design program for realizing; a view creating function for creating a view in which an origin and a coordinate system are set on a screen, a view frame creating function for creating a view frame which becomes an input region for the view created by the view creating function, a judgment function for judging, when a drawing element is being input to the view frame created by the view frame creating function, if part of the drawing element has been input to outside of the view frame, and a view frame enlarging function for enlarging, when judged by the judgment function that part of the drawing element has been input to outside of the view frame, the view frame so as to contain the drawing element.

Here, "recording medium" means any medium which allows reliable recording of electronic information and which also allows the reliable retrieval of the information as required; for example portable media such as magnetic tapes, magnetic disks, magnetic drums, IC cards and CD-ROMs.

With such a construction, a computer aided design program for realizing; a view creating function, a view frame creating function, a judgment function, and a view frame enlarging function is recorded on a recording medium. Consequently, with a recording medium on which such a program is recorded, a computer aided design apparatus according to the present invention can be easily constructed using a typical electronic computer system.

As a sixth means for solving the problems there is provided a recording medium on which is recorded a computer aided design program for realizing; a view creating function for creating a view in which an origin and a coordinate system are set on a screen, a view frame creating function for creating a view frame which becomes an input region for the view created by the view creating function, a judgment function for judging, when a drawing element is being input to the view frame created by the view frame creating function, if part of the drawing element has been input to outside of the view frame and a display scale factor modifying function for modifying, when judged by the judgment function that part of the drawing element has been input to outside of the view frame, a display scale factor for the drawing element and all of the already input drawing elements so that the drawing element and all of the already input drawing elements are displayed within the view frame.

With such a construction, a computer aided design program for realizing; a view creating function, a view frame creating function, a judgment function, and a display scale factor modifying function is recorded on a recording medium. Consequently, with a recording medium on which such a program is recorded, a computer aided design apparatus according to the present invention can be easily constructed using a typical electronic computer system.

DESCRIPTION OF THE PREFERRED EMBODIMENTS

As follows is a detailed description of the present invention with reference to the appended drawings.

Figure 1:
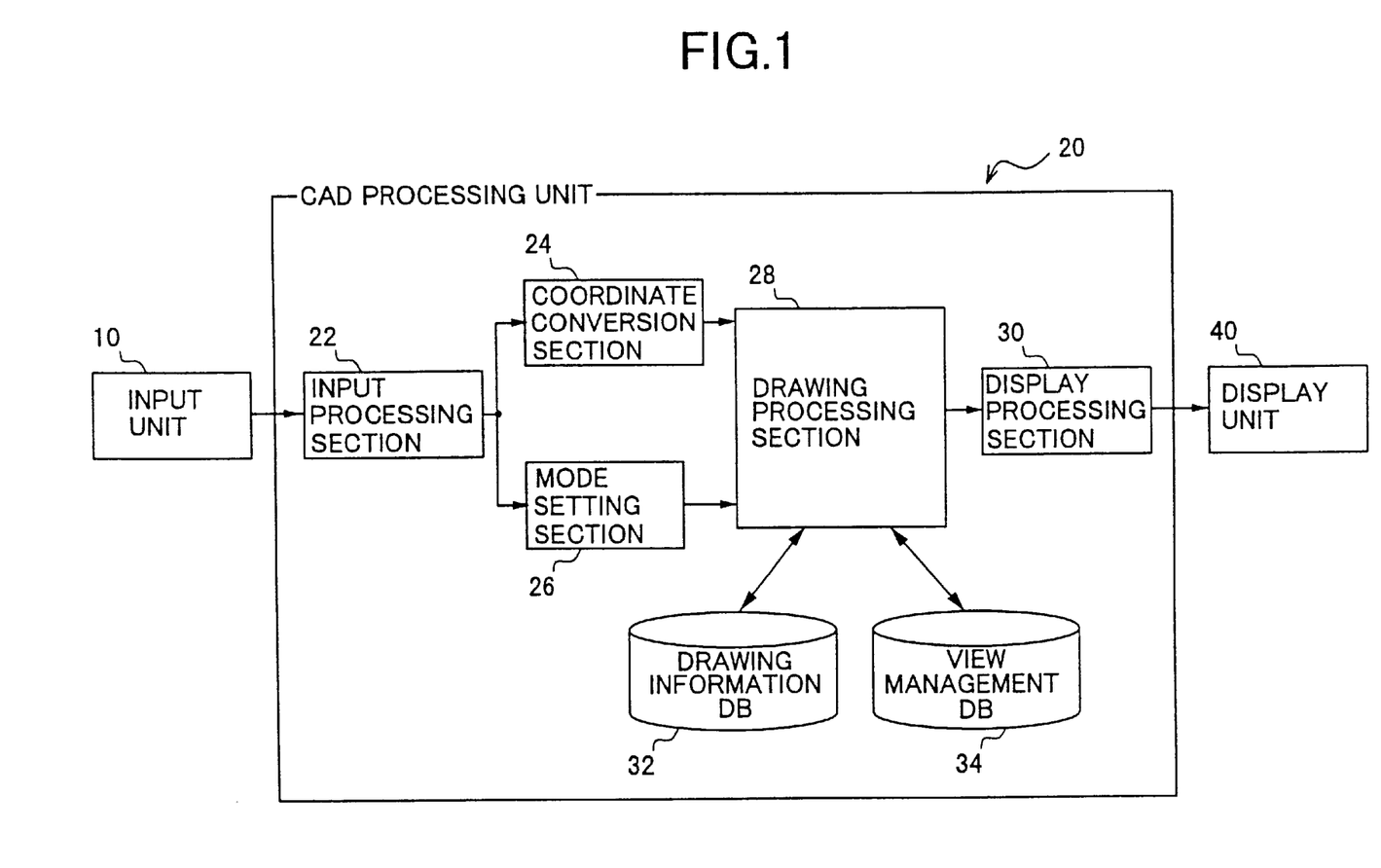
FIG. 1 is a structural diagram of a computer aided design apparatus according to the present invention.

FIG. 1 shows the construction of a computer aided design apparatus according to the present invention. The computer aided design apparatus is one wherein there is provided a view function for creating a view in which an origin and a coordinate system are set on a screen, and creating a view frame which becomes an input region for the created view.

The computer aided design apparatus comprises an input unit 10, a CAD processing unit 20 and a display unit 40. The input unit 10 comprises a pointing device such as a mouse, and a keyboard, and performs input for example of control points or characters for a drawing element. The CAD processing unit 20 comprises a computer provided with at least a central processing unit (CPU) and a memory, and performs various drawing processing according to a program loaded into the memory. The display unit 40 comprises a graphic display such as a CRT, and displays design drawings and the like.

Furthermore, the CAD processing unit 20 comprises; an input processing section 22, a coordinate conversion section 24, a mode setting section 26, a drawing processing section 28, a display processing section 30, a drawing information data base 32, and a view management data base 34. The input processing section 22 converts signals from the input unit 10 into drawing element information such as control points for drawing elements. The coordinate conversion section 24 converts control point information for the drawing elements, which has been converted by the input processing section 22, into a coordinate system for performing actual processing. The mode setting section 26 sets various modes (to be described later in detail) based on instructions from the input unit 10 input via the input processing section 22. The drawing processing section 28 performs various drawing processing in the CAD. The display processing section 30 performs processing for displaying the drawing processed in the drawing processing section 28, on the display unit 40.

Here the drawing processing section 28 realizes by means of a program, a view creating device, a view frame creating device, a first judgment device, a view frame enlarging device, a second judgment device, an enlargement prohibit device, a rectangular region computing device, an enlarging device, a judgment device, a display scale factor modifying device, a reduction scale factor computing device, a modifying device, a view creating step, a view frame creating step, a judgment step, a view frame enlarging step, a display scale factor modifying step, a view creating function, a view frame creating function, a judgment function, a view frame enlarging function, and a display scale factor modifying function.

Here with the respective modes set in the mode setting section 26, there is a view frame display mode, a view frame automatic enlargement mode, and a display scale factor automatic modification mode. The view frame display mode is a mode for setting, in the case where a view frame is created, whether or not to display the created view frame. That is to say, when the view frame display mode is not set, normally a view frame is not displayed. The view frame automatic enlargement mode is a mode for automatically enlarging the view frame so as to contain the input drawing element, when part of the drawing element is input to outside of the view frame. The display scale factor automatic modification mode is a mode for automatically modifying the display scale factor for the drawing element when part of the drawing element is input to outside of the view frame, so that the input drawing element and all of the already input drawing elements are displayed within the view frame. Here the view frame automatic enlargement mode and the display scale factor automatic modification mode are exclusively set, that is to say one or other is set.

Figure 2:
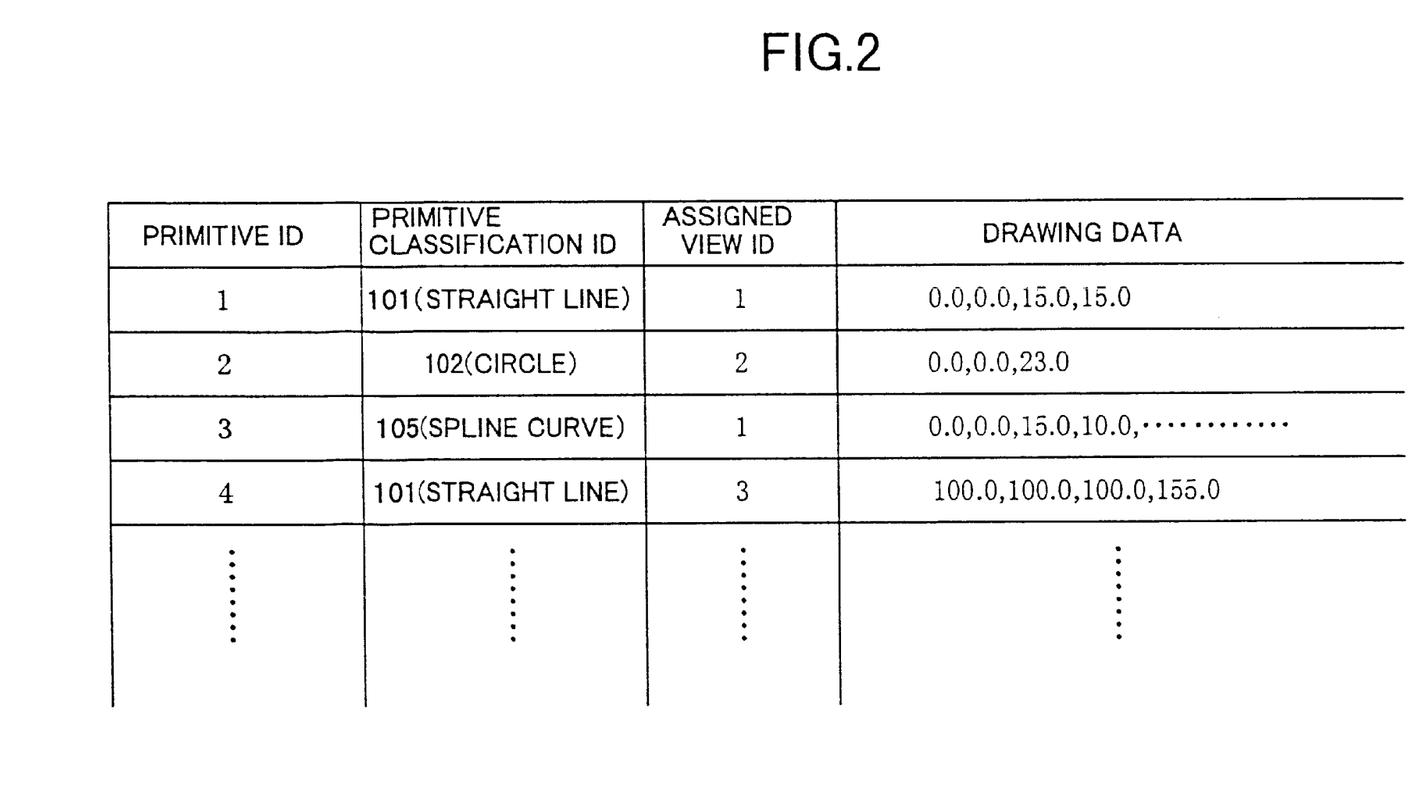
FIG. 2 is an explanatory diagram of drawing information stored in a drawing information data base.

In the drawing information data base 32 is stored drawing element information input via the input unit 10. The drawing element information comprises, as shown in FIG. 2, primitive ID, primitive classification ID, assigned view ID, and drawing data. In the primitive ID is stored unique identifiers for specifying respective drawing elements. In the primitive classification ID is stored identifiers for specifying classification of the drawing elements, for example, identifiers such as "101" for a straight line, "102" for a circle, "105" for a spline curve. In the assigned view ID is stored identifiers for specifying the view into which the drawing element is input. In the drawing data is stored control points corresponding to the classification of the drawing elements; for example in the case of a straight line, the starting point coordinate and the finishing point coordinate.

Figure 3:
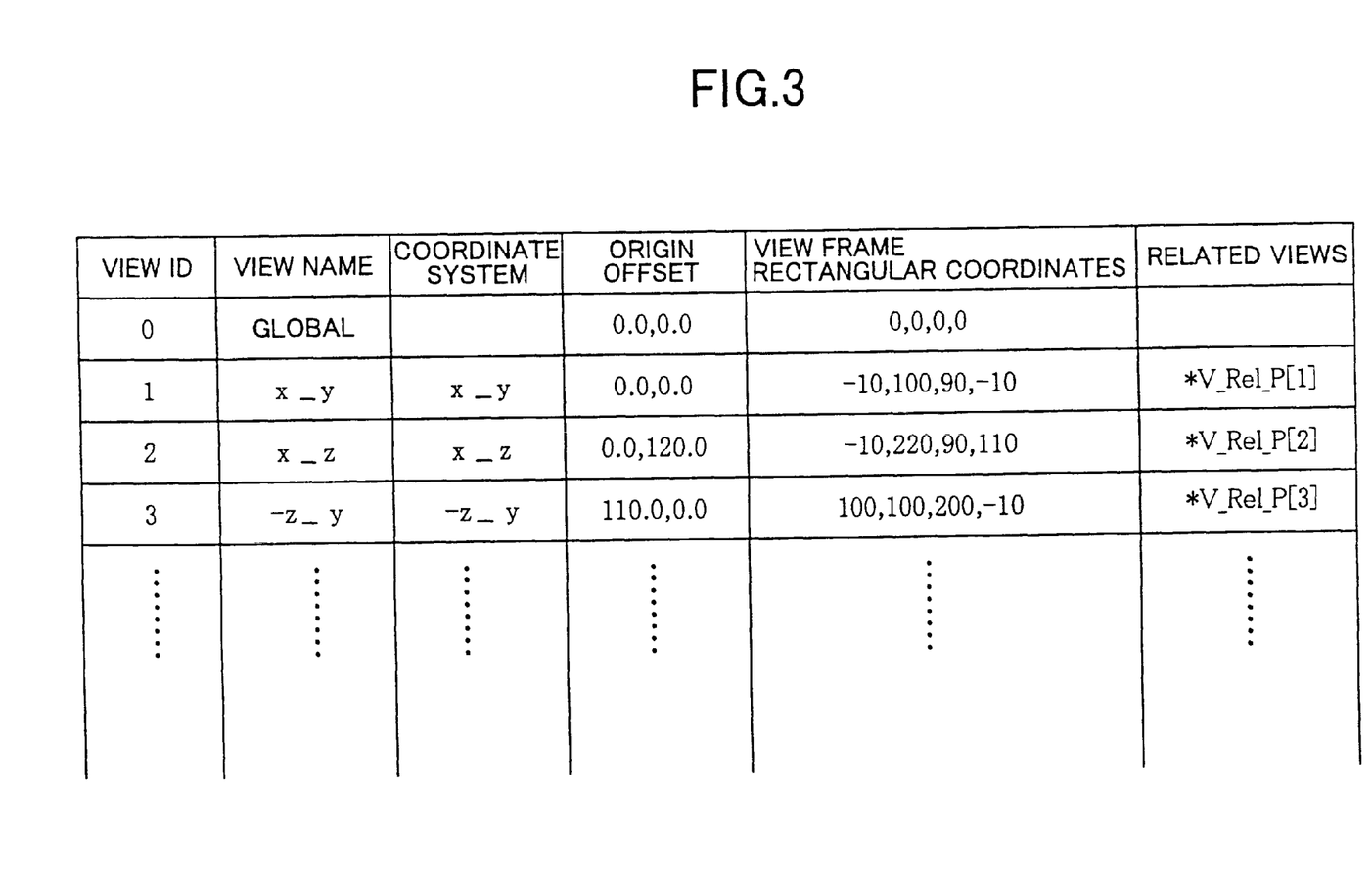
FIG. 3 is an explanatory diagram of view information stored in a view management data base.
Figure 4:
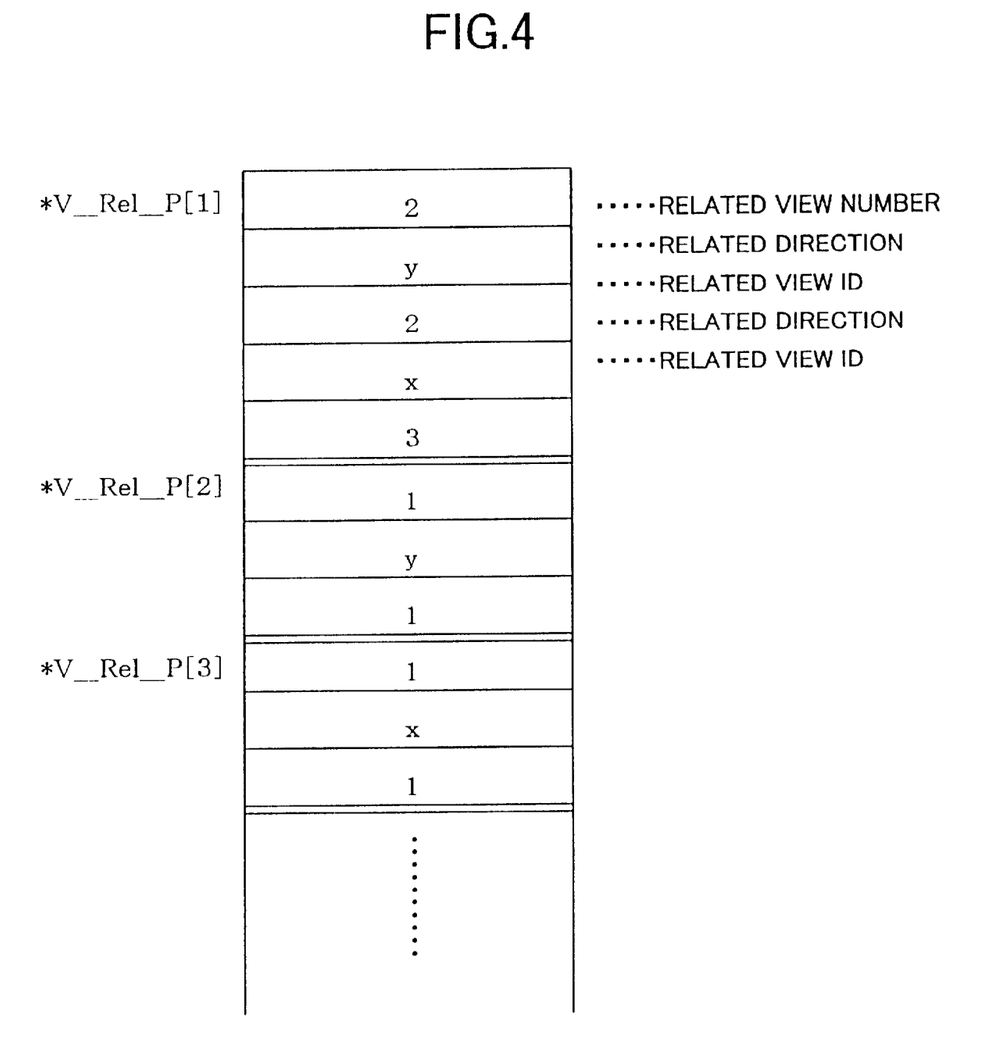
FIG. 4 is an explanatory diagram of related view information for constructing view information.

In the view management data base 34 is stored various view information related to the view and the view frame. The view information, as shown in FIG. 3, comprises view ID, view name, coordinate system, origin offset, view frame rectangular coordinates, and related views. In the view ID is stored unique identifiers for specifying respective views. In the view name is stored the names of the views which have been named by the user or automatically. In the coordinate system is stored information for specifying the coordinate system set in the view; for example the x_y coordinate system, the x_z coordinate system etc. In the origin offset is stored, in a global coordinate system, the origin position coordinates for the respective views. In the view frame rectangular coordinates is stored, in a global coordinate system, rectangular coordinates for the case where the view frame has been created. Here, in the case where the view frame has not been created, the rectangular coordinates are not stored in the view frame rectangular coordinates. In the related views is stored other view information which is related to the respective views. More specifically, in the related views is stored pointers indicating positions where other view information is stored. Then, when referring to the other view information based on the relevant pointer, as shown in FIG. 4, the number of related views, the related direction and the related view ID can be referred to.

A summary of the operation of the computer aided design apparatus of such a construction, will now be explained with reference to FIG. 5 through FIG. 8.

Figure 5:
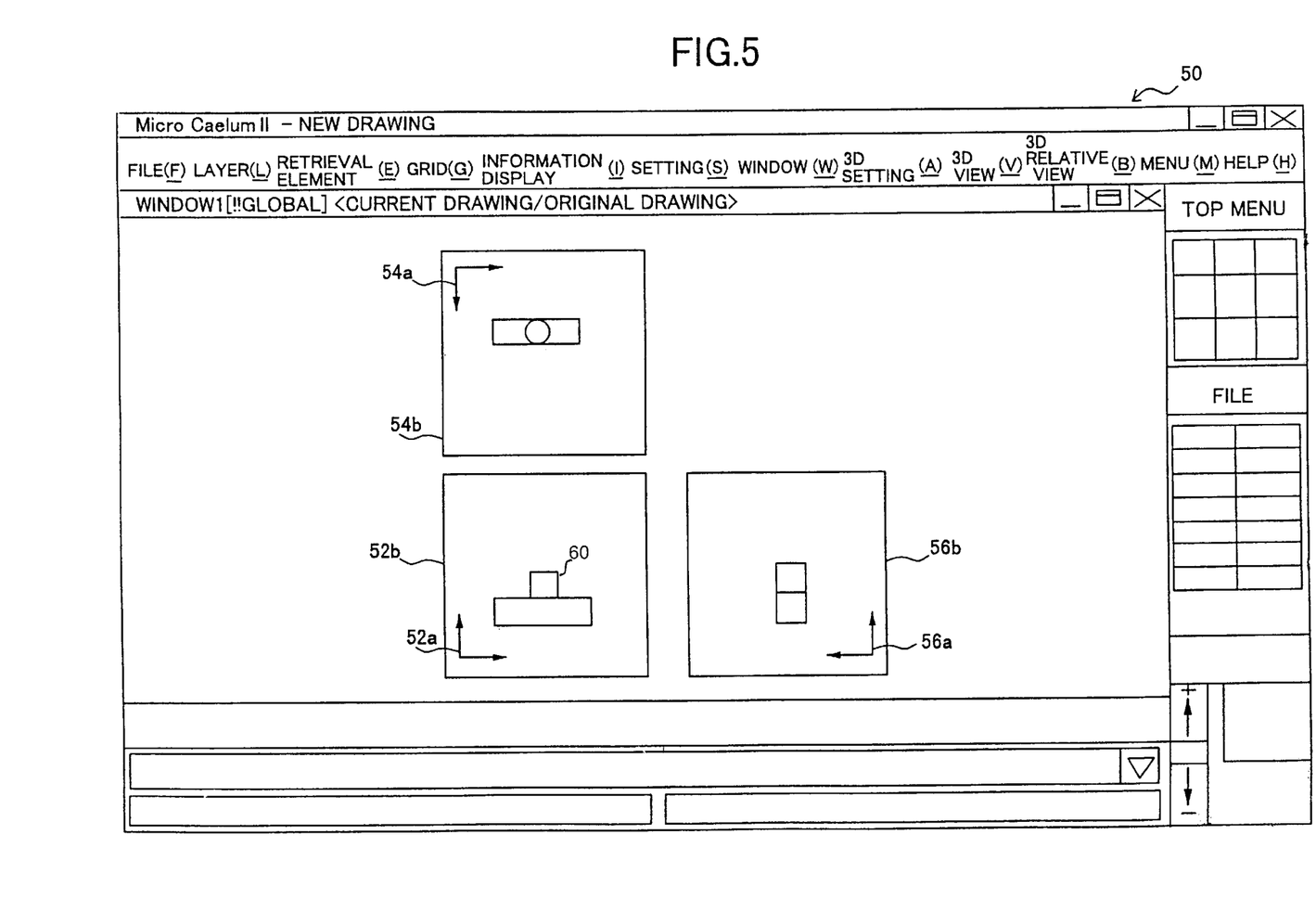
FIG. 5 is an explanatory diagram of a CAD operating screen.
Figure 6:
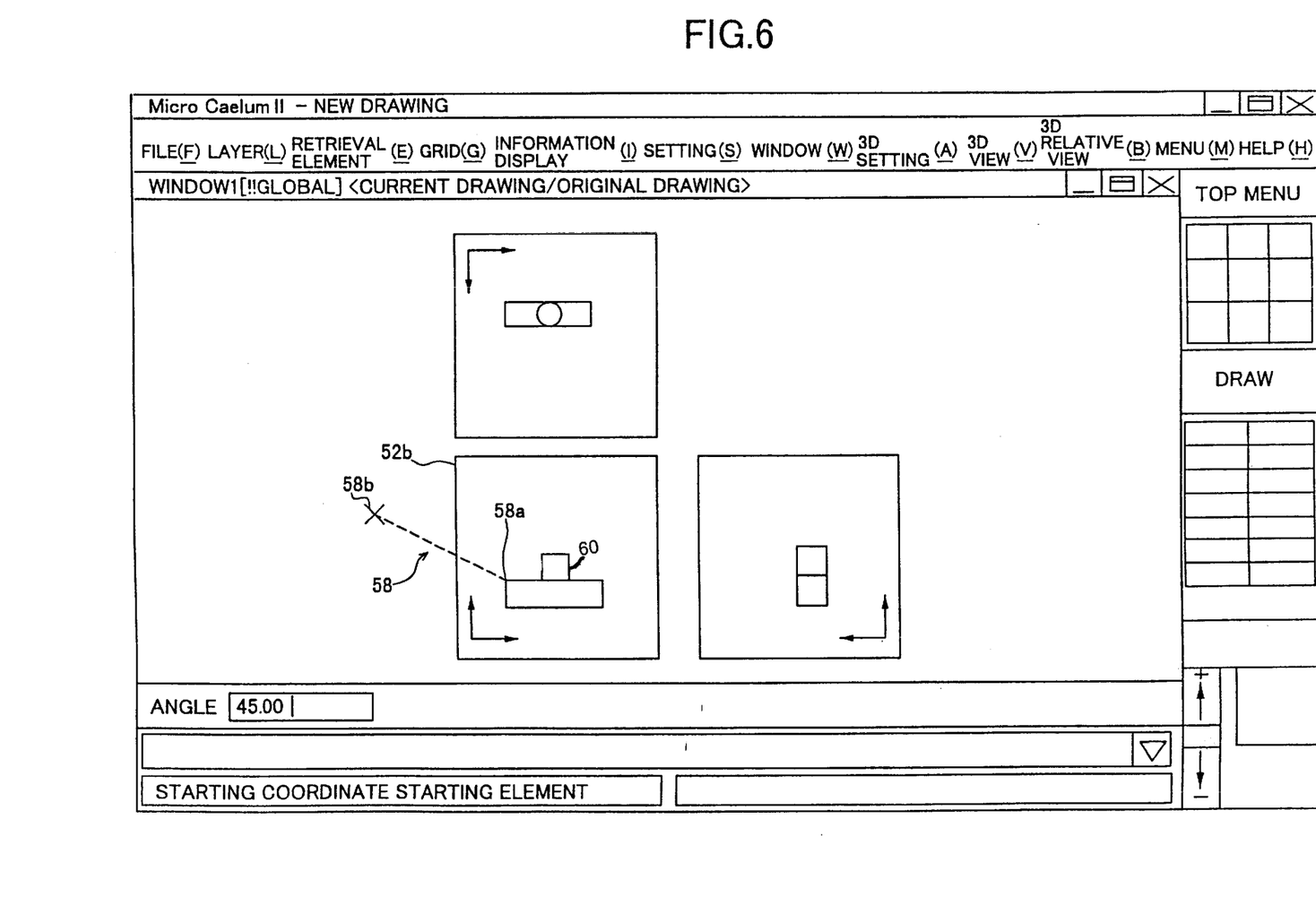
FIG. 6 is an explanatory diagram of a straight line input operation in the CAD operating screen.
Figure 7:
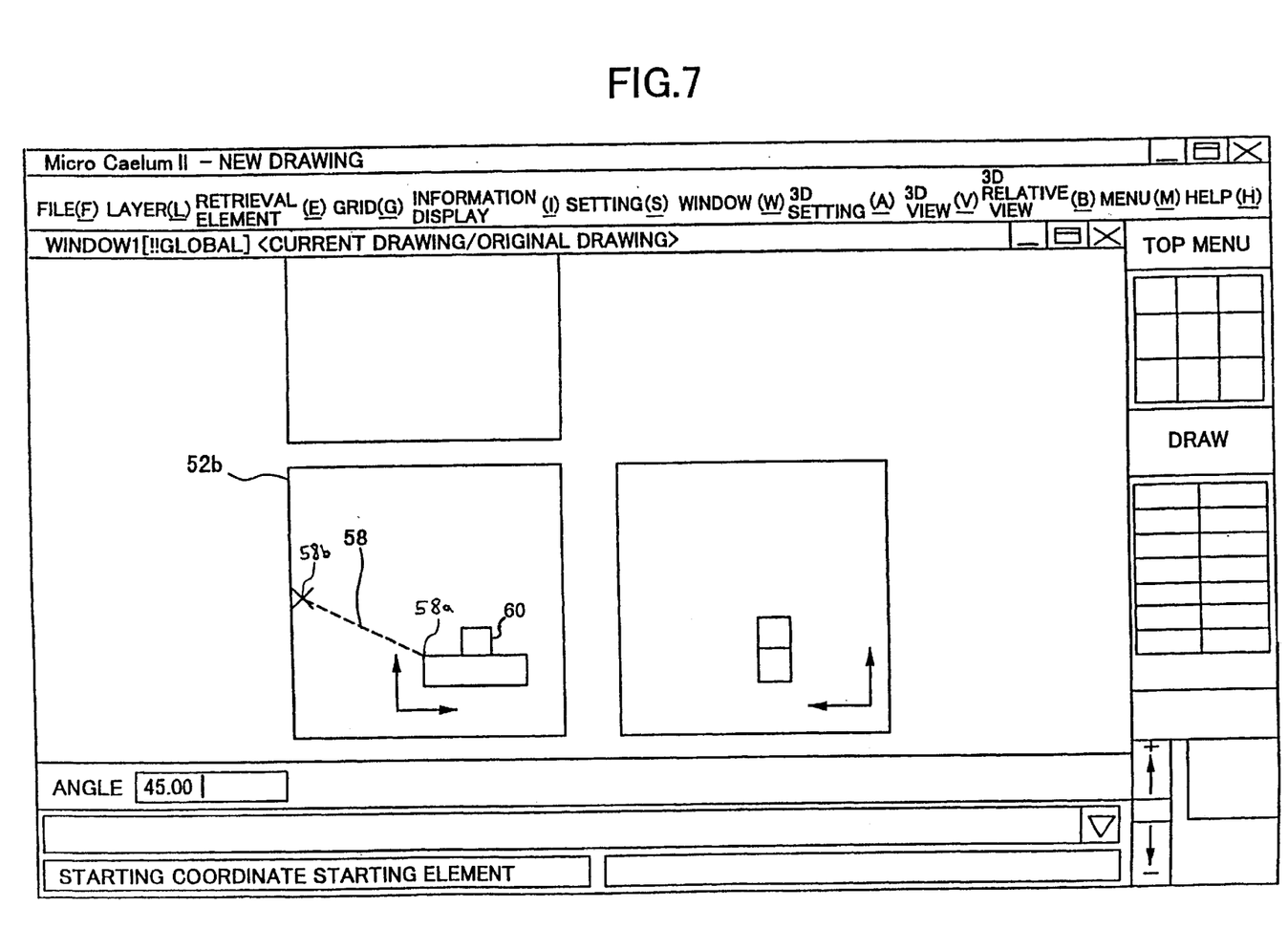
FIG. 7 is an explanatory diagram for after view frame automatic enlargement in the CAD operating screen.
Figure 8:
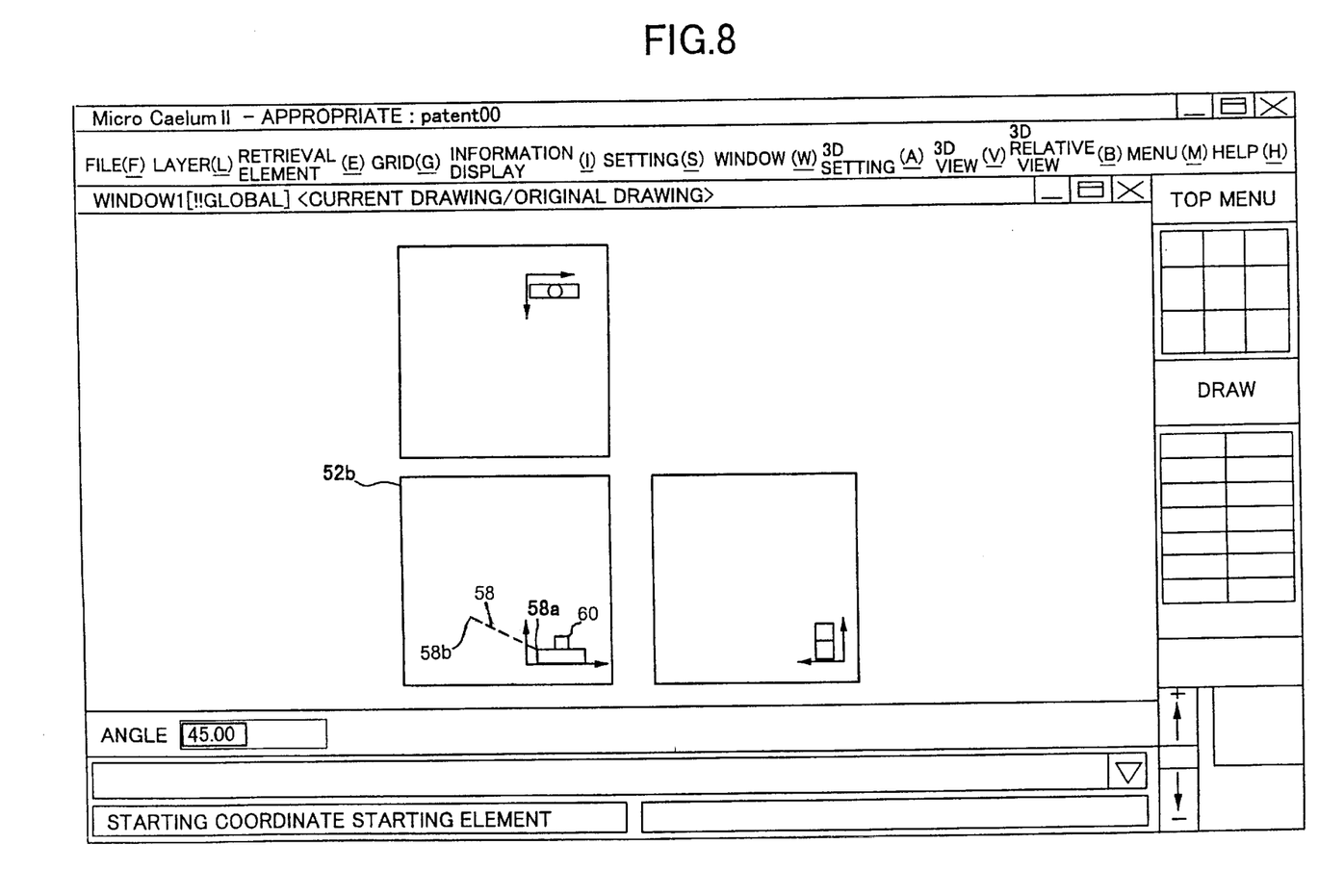
FIG. 8 is an explanatory diagram for after display scale factor automatic modification in the CAD operating screen.

FIG. 5 shows a CAD operating screen 50 displayed on the display unit 40. In the CAD operating screen 50, in order to perform the drawing for the three views (elevation view, plan view and side view), three views, namely views 52a, 54a and 56a, and view frames 52b, 54b and 56b are created. In this condition as shown in FIG. 6 a straight line 58 serving as a drawing element is input to the elevation view. Here when the start point 58a of the straight line 58 is pointed within the view frame 52b and the finish point 58b of the straight line 58 is pointed outside the view frame 52b, then as shown in FIG. 7, the view frame 52b is automatically enlarged so as to contain the input straight line 58. Alternatively as shown in FIG. 8, the display scale factor is automatically modified so as to display the input straight line 58 and all of the already input drawing elements 60 within the view frame 52b. Automatic enlargement of the view frame 52b or automatic modification of the display scale factor is optionally set by the user by means of a function provided by the mode setting section 26.

Figure 9:
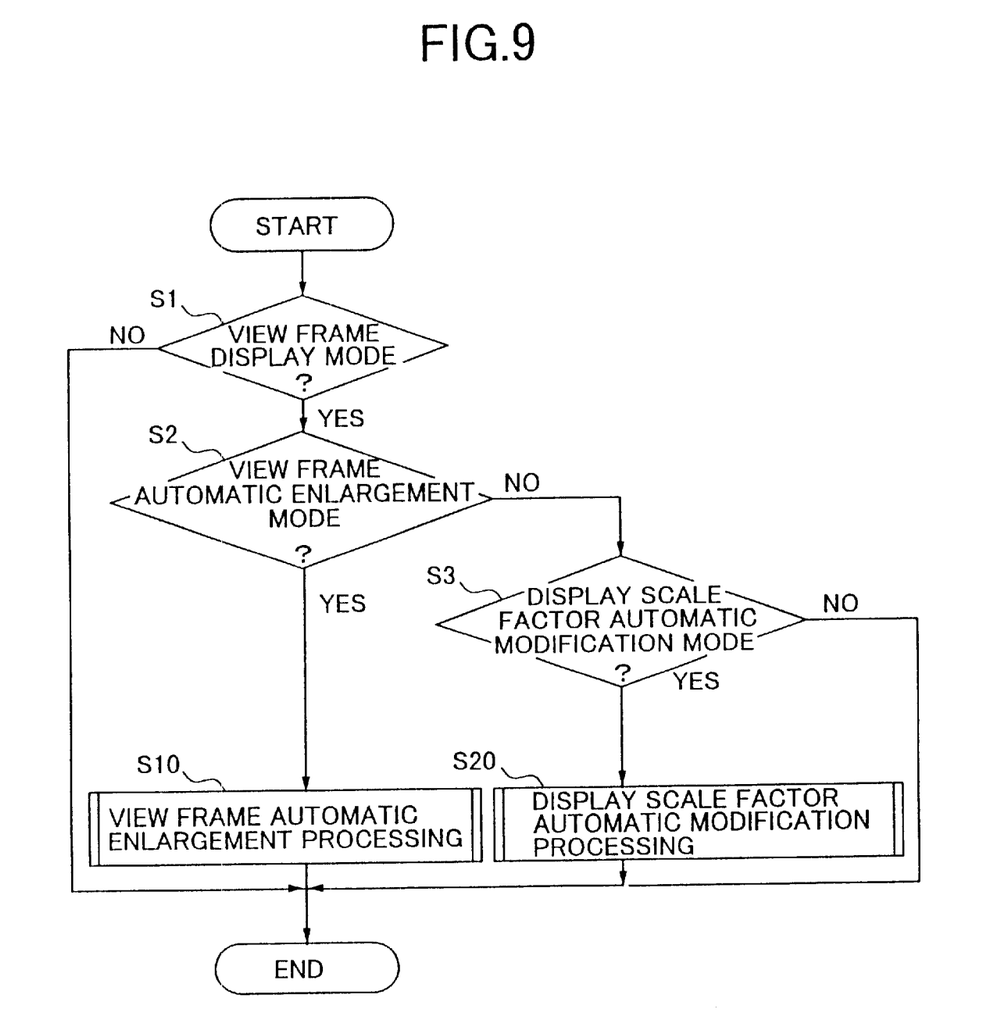
FIG. 9 is a flow chart of a main routine.
Figure 10:
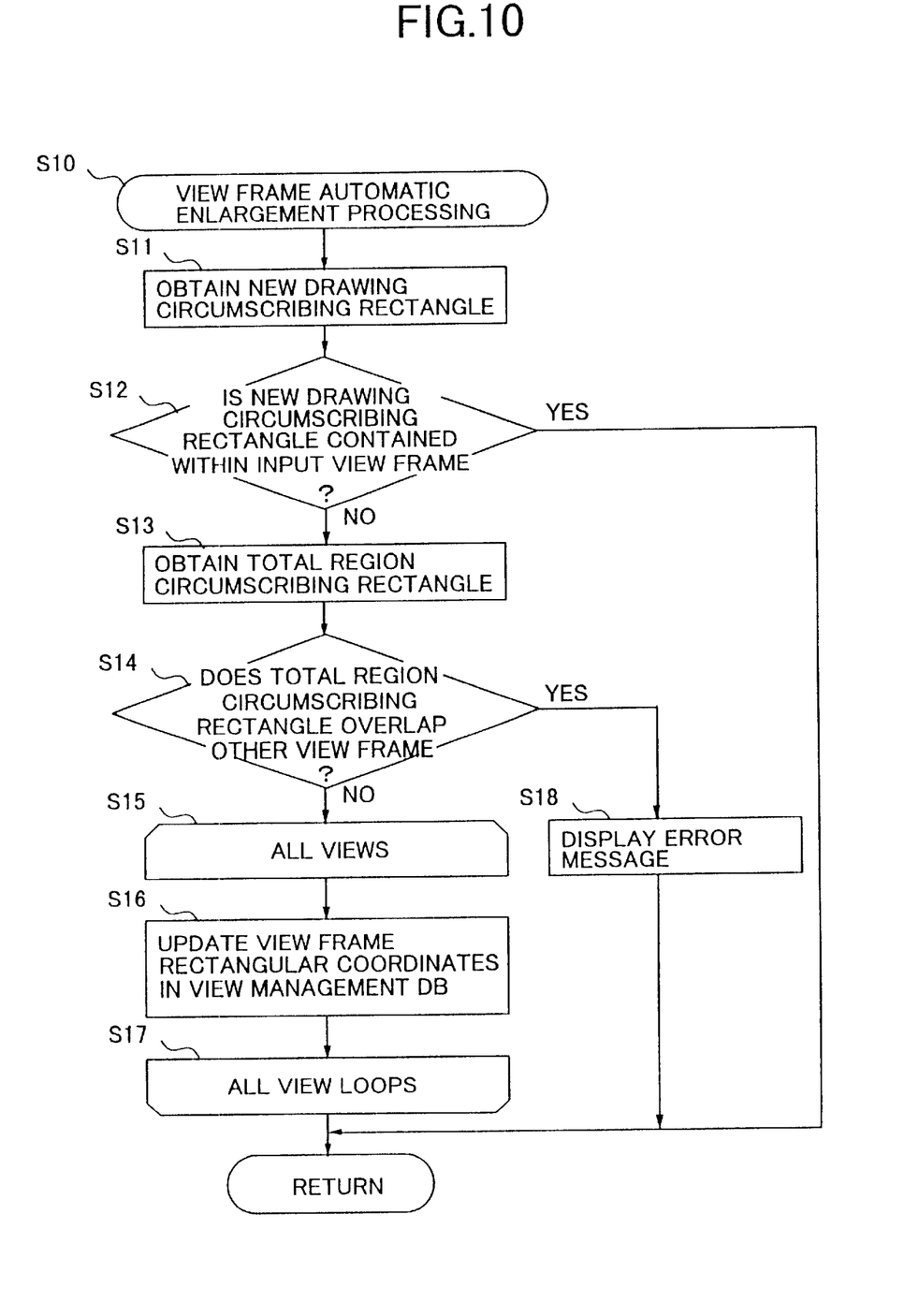
FIG. 10 is a flow chart of a subroutine for automatically enlarging view frames.
Figure 11:
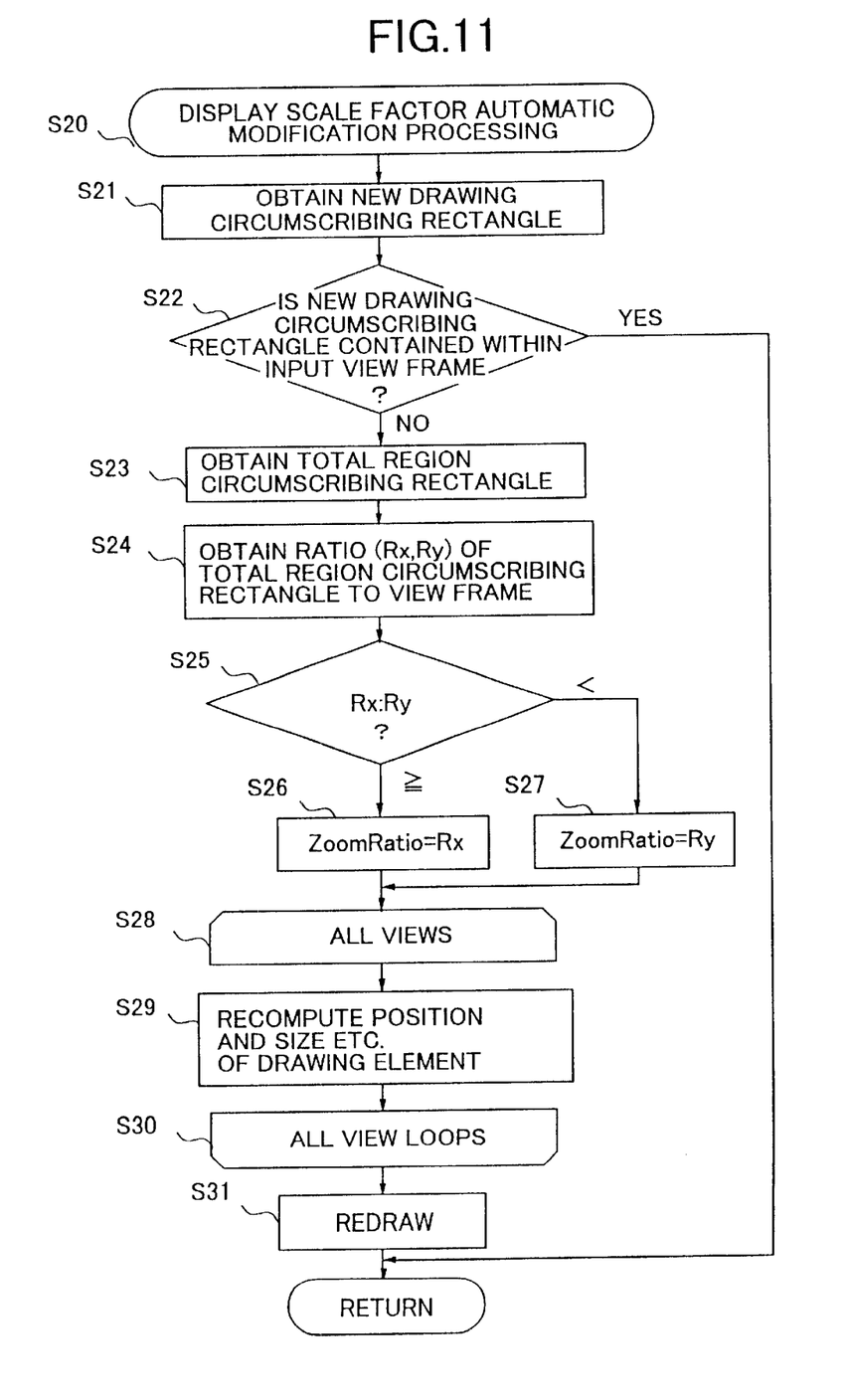
FIG. 11 is a flow chart of a subroutine for automatically modifying display scale factors.

Such a function is realized by the flow charts shown in FIG. 9 through FIG. 11.

FIG. 9 shows a flow chart of a main routine. This main routine is executed each time a drawing element is input by the input unit 10.

In step 1 (abbreviated to S1 in the figures, with other steps similarly abbreviated) it is judged if there is a view frame display mode for displaying a view frame. If there is a view frame display mode, control proceeds to step 2 (YES), while if there is not a view frame display mode, processing is terminated as is (NO).

In step 2 it is judged if there is a view frame automatic enlargement mode for automatically enlarging the view frame. If there is a view frame automatic enlargement mode, control proceeds to step 10 (YES), and a subroutine (see FIG. 10) for automatically enlarging the view frame is called. On the other hand, if there is no view frame automatic enlargement mode, control proceeds to step 3 (NO).

In step 3 it is judged if there is a display scale factor automatic modification mode for automatically modifying the display scale factor for the drawing element. If there is a display scale factor automatic modification mode, control proceeds to step 20 (YES), and a subroutine (see FIG. 11) for automatically modifying the display scale factor is called. On the other hand, if there is no display scale factor automatic modification mode, processing is terminated as is (NO).

With the above described main routine, if there is a view frame display mode and a view frame automatic enlargement mode, then view frame automatic enlargement processing is executed. On the other hand, if there is a view frame display mode and a display scale factor automatic modification mode, then display scale factor automatic modification processing is executed. That is to say the main routine executes branch processing corresponding to the various modes.

FIG. 10 shows a flow chart of the subroutine for automatically enlarging the view frame.

Figure 12:
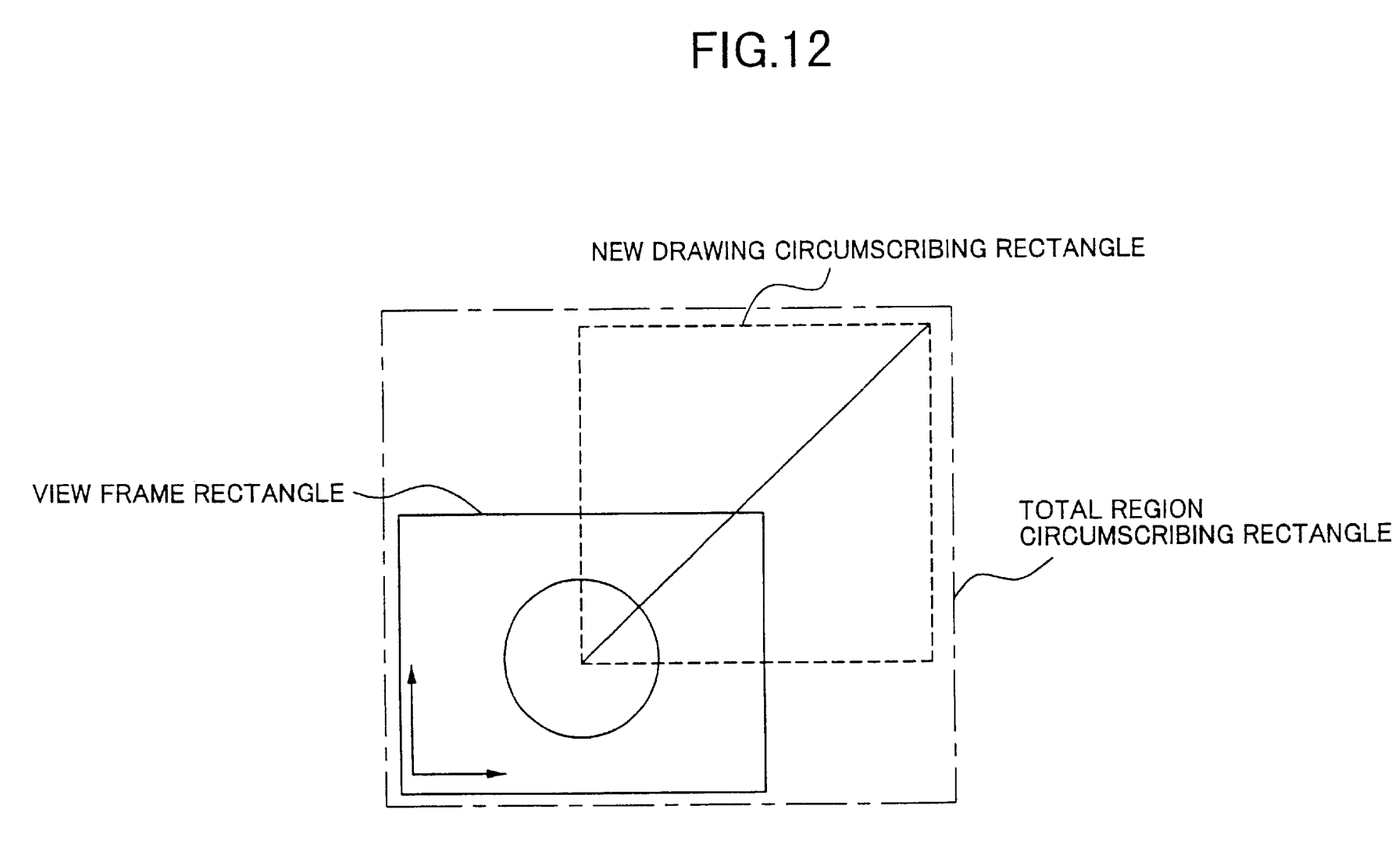
FIG. 12 is an explanatory diagram of a circumscribing rectangle.

In step 11 a circumscribing rectangle for the drawing element input to the view frame (referred to hereunder as the new drawing) is obtained. The circumscribing rectangle as shown in FIG. 12, is termed the minimum size rectangle which contains the new drawing. For example in the case where the new drawing is a straight line, this corresponds to the rectangle which defines control points for the start point and the finish point.

In step 12 it is judged if the circumscribing rectangle for the new drawing is contained within the view frame into which the new drawing is input (referred to hereunder as the "input view frame"), that is to say if the new drawing is only input to within the view frame. If the circumscribing rectangle for the new drawing is contained within the input view frame (YES), processing is terminated, while if the circumscribing rectangle for the new drawing is not contained within the input view frame (NO), control proceeds to step 13.

Here, the processing of step 11 and step 12 corresponds to the first judgment device, the judgment step and the judgment function.

In step 13 the circumscribing rectangle, being the total region of the input view frame and the circumscribing rectangle for the new drawing, is obtained. The circumscribing rectangle for the total region, as shown in FIG. 12, is the rectangle which contains both the view frame rectangle and the circumscribing rectangle for the new drawing, and is termed the minimum size rectangle. Here, the processing of step 13 corresponds to the rectangular region computing device.

In step 14 it is judged if the circumscribing rectangle for the total region would overlap another view frame, that is to say, if when the view frame is to be enlarged, this would overlap another view frame. If the circumscribing rectangle for the total region would overlap another view frame, control proceeds to step 18 (YES), and performs display of an error message to the effect that view frame enlargement is not possible. On the other hand if the circumscribing rectangle for the total region would not overlap another view frame, control proceeds to step 15 (NO). Here the processing of step 14 corresponds to the second judgment device and the enlargement prohibit device.

In step 15 through step 17, enlargement processing of the view frames for all of the views is performed. That is to say, in step 16 the view frame rectangular coordinates for the view management data base 34 are updated so that the view frame coincides with the circumscribing rectangle for the total region. At this time, the view frames other than the input view frame are aligned with the input view frame by referring to the related views of the view management data base 34, and the height and/or width is increased. After this, re-drawing of the view frames is performed.

Here, the processing of step 13 through step 17 corresponds to the view frame enlarging device, the view frame enlarging step, and the view frame enlarging function, while the processing of step 15 through step 17 corresponds to the enlarging device.

With the view frame automatic enlargement processing as described above, when part of the new drawing is input to outside of the view frame, the circumscribing rectangle, being the total region of the input view frame and the circumscribing rectangle for the new drawing, is obtained. Then, in the case where the view frame is to be enlarged, if there will be no overlap with the other view frames, all of the view frames are automatically enlarged.

Consequently, even in the case where part of the drawing element is input exceeding the view frame, it is not necessary to perform enlargement of the view frame prior to input of the drawing element as heretofore, and hence operability of the CAD can be improved. Furthermore, with the enlargement of the view frame, since this is performed not only for the view frame into which the drawing element has been input, but also for the other view frame, then also in the case where the same drawing element is input to the other view frame, it is not necessary to perform view frame enlargement.

Here in step 14, when judged that the circumscribing rectangle for the total region would overlap the other view frame, repositioning of the view frames may be performed so that the view frames do not overlap.

FIG. 11 shows a flowchart for the subroutine for automatically modifying the display scale factor.

In step 21 the circumscribing rectangle for the drawing element input to the view frame is obtained.

In step 22 it is judged if the circumscribing rectangle for the new drawing is contained within the input view frame, that is to say if the new drawing is only input to within the view frame. If the circumscribing rectangle for the new drawing is contained within the input view frame (YES), processing is terminated, while if the circumscribing rectangle for the new drawing is not contained within the input view frame (NO), control proceeds to step 23.

Here, the processing of step 21 and step 22 corresponds to the judgment device, the judgment step and the judgment function.

In step 23 the circumscribing rectangle, being the total region of the input view frame and the circumscribing rectangle for the new drawing, is obtained. Here, the processing of step 23 corresponds to the rectangular region computing device.

In step 24 the ratio (Rx, Ry) between the circumscribing rectangle for the total region and the view frame is obtained. That is to say, with the coordinates of the circumscribing rectangle for the total region as $x_{1a}, y_{1a}, x_{2a}, y_{2a}$) and the coordinates of the view frame as $(x_{1b}, y_{1b}, x_{2b}, y_{2b})$, then the ratio (Rx, Ry) can be obtained from the following equation:

$$Rx=(x_{2a}-x_{1a})/(x_{2b}-x_{1b})$$

$$Ry=(y_{2a}-y_{1a})/(y_{2b}-y_{1b})$$

In step 25 a size comparison is made between Rx and Ry. If Rx≧Ry control proceeds to step 26, and Rx is set for a variable "ZoomRatio". On the other hand if Rx<Ry, control proceeds to step 27 and Ry is set for the variable "Zoom-Ratio". That is to say, by means of the processing of step 25 through step 27, a reduction scale factor for displaying the drawing element in the view frame is obtained for the variable "ZoomRatio".

In step 28 through step 30, modification processing for the display scale factor is performed with respect to all views. That is to say, the position and the size etc. of the drawing elements is recomputed using the variable "ZoomRatio".

In step 31 redrawing of all of the drawing elements is performed.

The processing of step 23 through step 31 corresponds to the display scale factor modifying device, the display scale factor modifying step, and the display scale factor modifying function. Furthermore, the processing of step 23 through step 27 corresponds to the reduction scale factor computing device, and the processing of step 28 through step 31 corresponds to the modifying device.

With the display scale factor automatic modification processing as described above, when part of the new drawing is input to outside of the view frame, the circumscribing rectangle, being the total region of the input view frame and the circumscribing rectangle for the new drawing, is obtained. Furthermore, a reduction scale factor for reducing the circumscribing rectangle for the total region to the view frame is obtained, and all of the drawing elements are redrawn using this reduction scale factor.

Consequently, even in the case where part of the drawing element is input exceeding the view frame, it is not necessary to perform modification of the display scale factor for the drawing element prior to input of the drawing element as heretofore, and hence operability of the CAD can be improved. Furthermore, with the modification of the display scale factor, since this is performed not only for the view frame into which the drawing element has been input, but also for the other view frame, then also in the case where the same drawing element is input to the other view frame, it is not necessary to perform modification of the display scale factor.

By recording a program for realizing these functions onto portable media such as for example magnetic tape, magnetic disc, magnetic drum, IC card, CD ROM, the computer aided design program of the present invention can be distributed to the market. Furthermore, any person acquiring the program on such media could easily construct a computer aided design apparatus using a typical electronic computer system.

I claim:

1. A computer aided design apparatus comprising;
    view creating means for creating a view in which an origin and a coordinate system are set on a screen,
    view frame creating means for creating a view frame which becomes an input region for the view created by said view creating means,
    first judgment means for judging, when a drawing element is being input to the view frame created by said view frame creating means, if part of said drawing element has been input to outside of said view frame, and
    view frame enlarging means for enlarging, when judged by said first judgment means that part of said drawing element has been input to outside of said view frame, the view frame so as to contain said drawing element.

2. A computer aided design apparatus according to claim 1, wherein in the case where there is another view frame other than said view frame into which said drawing element has been input, said view frame enlarging means also enlarges said other view frame.

3. A computer aided design apparatus according to claim 2, wherein said view frame enlarging means comprises;
    second judgment means for judging, in the case where said view frame into which said drawing element has been input is enlarged, if said view frame would overlap said other view frame, and
    enlargement prohibit means for prohibiting enlargement of said view frame into which said drawing element has been input and said other view frame, when judged by said second judgment means that there would be overlap.

4. A computer aided design apparatus according to claim 1, wherein said view frame enlarging means comprises;
    rectangular region computing means for computing a rectangular region circumscribing said drawing element and all of the already input drawing elements, and
    enlarging means for enlarging said view frame into which said drawing element has been input so as to coincide with the rectangular region computed by said rectangular region computing means.

5. A computer aided design apparatus comprising;
    view creating means for creating a view in which an origin and a coordinate system are set on a screen,
    view frame creating means for creating a view frame which becomes an input region for the view created by said view creating means,
    judgment means for judging, when a drawing element is being input to the view frame created by said view frame creating means, if part of said drawing element has been input to outside of said view frame, and
    display scale factor modifying means for modifying, when judged by said judgment means that part of said drawing element has been input to outside of said view frame, a display scale factor for the drawing element and all of the already input drawing elements so that said drawing element and all of the already input drawing elements are displayed within said view frame.

6. A computer aided design apparatus according to claim 5, wherein in the case where there is another view frame other than said view frame into which said drawing element has been input, said display scale factor modifying means also modifies the display scale factor for said other view frame.

7. A computer aided design apparatus according to 5, wherein said display scale factor modifying means comprises; rectangular region computing means for computing a rectangular region circumscribing the drawing element and all of the already input drawing elements, reduction scale factor computing means for computing a reduction scale factor for displaying said drawing element and all of the already input drawing elements within the rectangular region computed by said rectangular region computing means, and modifying means for modifying the display scale factor for said drawing element and all of the already input drawing elements, based on the reduction scale factor computed by said reduction scale factor computing means.

8. A computer aided design method comprising;

a view creating step for creating a view in which an origin and a coordinate system are set on a screen, a view frame creating step for creating a view frame which becomes an input region for the view created by said view creating step, a judgment step for judging, when a drawing element is being input to the view frame created by said view frame creating step, if part of said drawing element has been input to outside of said view frame, and a view frame enlarging step for enlarging, when judged by said judgment step that part of said drawing element has been input to outside of said view frame, the view frame so as to contain said drawing element.

9. A computer aided design method comprising;

a view creating step for creating a view in which an origin and a coordinate system are set on a screen, a view frame creating step for creating a view frame which becomes an input region for the view created by said view creating step, a judgment step for judging, when a drawing element is being input to the view frame created by said view frame creating step, if part of said drawing element has been input to outside of said view frame, and a display scale factor modifying step for modifying, when judged by said judgment step that part of said drawing element has been input to outside of said view frame, a display scale factor for the drawing element and all of the already input drawing elements so that said drawing element and all of the already input drawing elements are displayed within said view frame.

10. A recording medium on which is recorded a computer aided design program for realizing;

a view creating function for creating a view in which an origin and a coordinate system are set on a screen, a view frame creating function for creating a view frame which becomes an input region for the view created by said view creating function, a judgment function for judging, when a drawing element is being input to the view frame created by said view frame creating function, if part of said drawing element has been input to outside of said view frame, and a view frame enlarging function for enlarging, when judged by said judgment function that part of said drawing element has been input to outside of said view frame, the view frame so as to contain said drawing element.

11. A recording medium on which is recorded a computer aided design program for realizing;

a view creating function for creating a view in which an origin and a coordinate system are set on a screen, a view frame creating function for creating a view frame which becomes an input region for the view created by said view creating function, a judgment function for judging, when a drawing element is being input to the view frame created by said view frame creating function, if part of said drawing element has been input to outside of said view frame, and a display scale factor modifying function for modifying, when judged by said judgment function that part of said drawing element has been input to outside of said view frame, a display scale factor for the drawing element and all of the already input drawing elements so that said drawing element and all of the already input drawing elements are displayed within said view frame.

* * * * *